Figure 1:
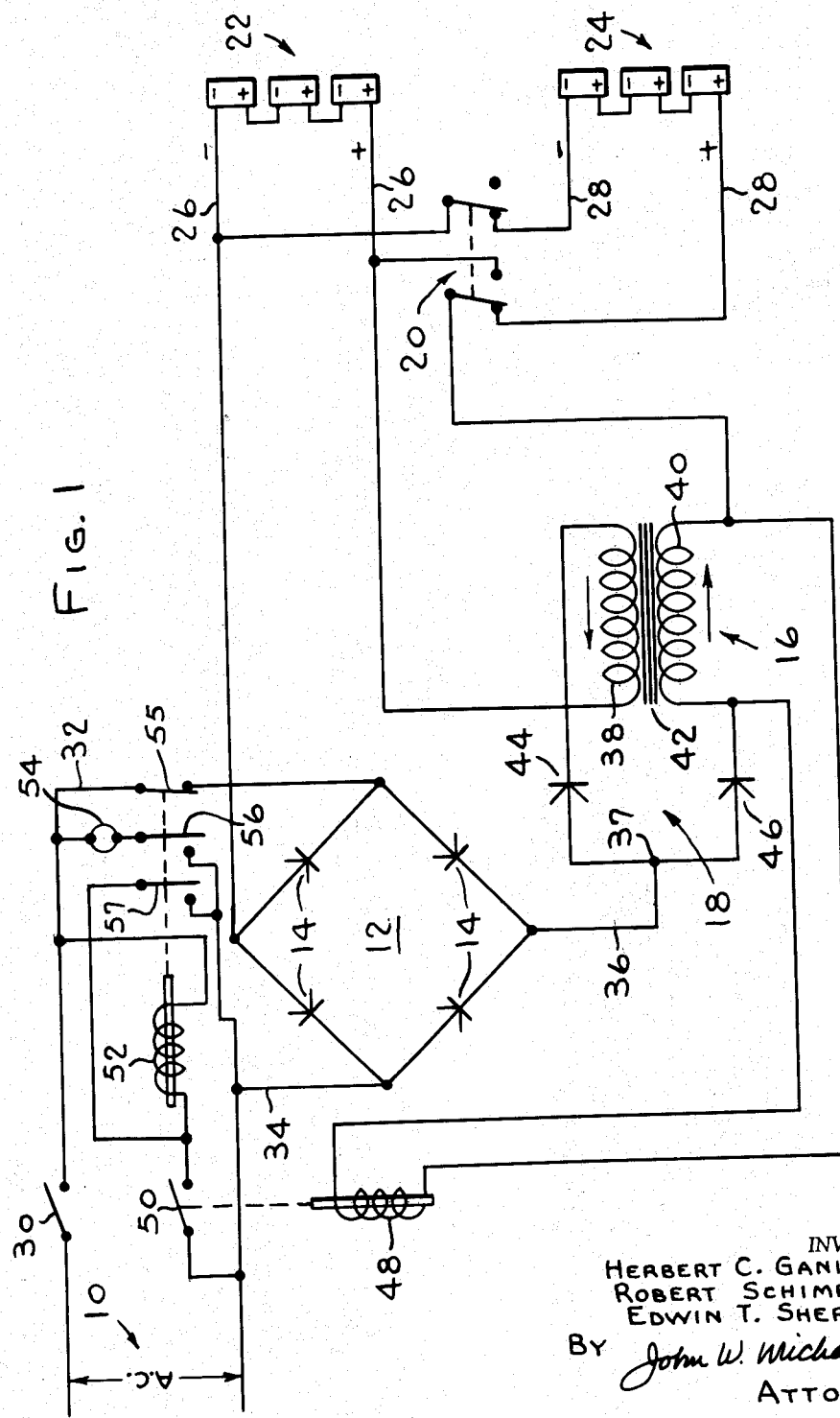

United States Patent Office 3,021,469
Patented Feb. 13, 1962

3,021,469
DIVIDER CIRCUIT FOR BATTERY CHARGER
Herbert C. Ganiere and Robert Schimek, Milwaukee, and Edwin T. Sherwood, Bayside, Wis., assignors to Globe-Union Inc., Milwaukee, Wis., a corporation of Delaware
Filed Aug. 26, 1960, Ser. No. 52,259
8 Claims. (Cl. 320—15)

This invention relates to a current divider circuit for a battery charger.

Over the past several years the percentage of 12-volt storage batteries produced in this country has increased while the percentage of 6-volt batteries has decreased. It has become desirable, therefore, that charging apparatus for forming and maintaining a battery in charged condition be adapted to accommodate both 6-volt and 12-volt batteries at the least possible expense and with the greatest efficiency possible.

It is an object of this invention to provide a current divider circuit for a conventional battery charger which will adapt the charger for use with an equal number of either 6-volt or 12-volt batteries.

Another object is to provide such a circuit which will divide the rectifier current output between two parallel connected loads and maintain an equal current in each load.

Another object is to provide a divider circuit which is adapted to automatically indicate when a substantial unbalance between loads develops.

The battery charging circuit of this invention is adapted for charging two parallel connected groups of batteries from a common source of alternating current and includes a rectifier means for converting the alternating current to direct current, a balancing transformer connected to the output from the rectifier means, and a blocking diode assembly to prevent circulating current between the two groups of batteries. The balancing transformer includes a pair of coils wound on a common core with one coil connected in each circuit feeding a group of batteries in such a manner that the flow of currents in the coils produces opposing magnetic flux in the common core. The blocking diode assembly includes a pair of diodes, one being connected in the conducting direction from the power source to each current input end of the balancing transformer coils, the pair being in a back-to-back, current blocking connection between the input ends of the balancing transformer.

To prevent damage to the batteries and charging equipment a means for detecting a substantial unbalance between the two parallel connected loads is provided. Such means includes a relay coil connected across either one of the transformer coils which will be energized when a substantial unbalance occurs. The relay is adapted when energized to shut down the charging equipment and turn on an indicating light to call attention to the trouble.

A modification of the invention includes an arrangement whereby the rectifying bridge and blocking diode assembly are combined in such a way so that four of the six diodes of the combined unit have a dual function of both rectifying the charging current and blocking the circulating current. This arrangement provides an advantage in that four of the six diodes of the combined unit are required to carry only one-half the total charging current.

Figure 2:
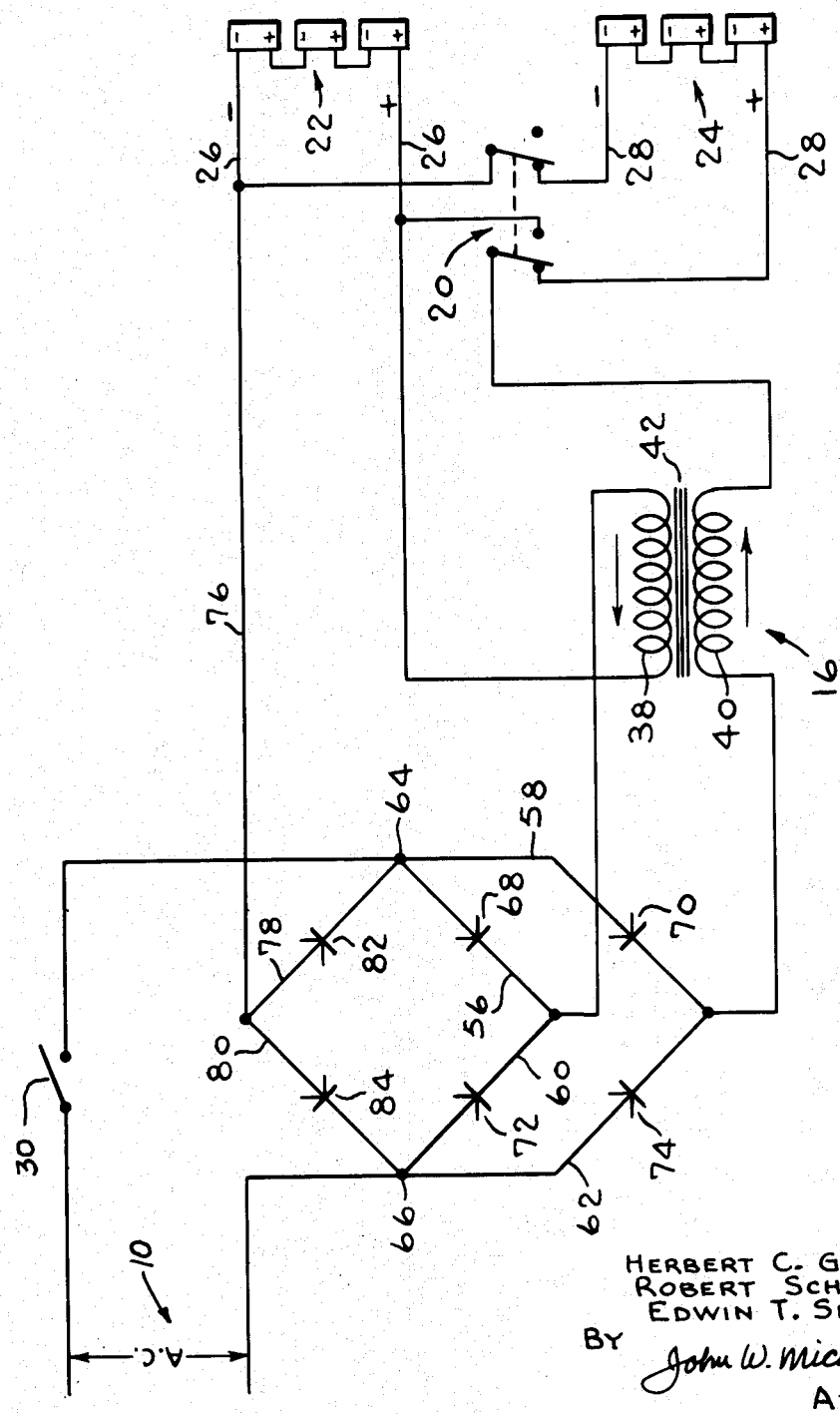

Other objects and advantages will be pointed out in, or be apparent from the specification and claims, as will obvious modifications of the two embodiments shown in the drawings, in which:

FIG. 1 is a simplified wiring diagram showing one embodiment of this invention; and FIG. 2 is a simplified wiring diagram showing a second embodiment of the invention.

Referring to FIG. 1, a source of alternating current 10 is connected to a full-wave rectifier bridge 12 comprising four rectifier diodes 14 connected in a conventional manner.

Prior to the advent of the 12-volt storage battery, a group of 6-volt batteries could be formed by connecting them directly to a rectifier such as that shown in FIG. 1 and feeding the proper amount of current to the batteries from source 10. To adapt such equipment for charging 12-volt batteries is the problem with which this invention is concerned. Since only one-half as much current is needed to charge a 12-volt battery, it is necessary to divide the rectifier current output from bridge 12 between two parallel connected groups of 12-volt batteries and to maintain equal current in each group irrespective of variations between the two loads.

This is accomplished in the FIG. 1 embodiment by a circuit which includes a balancing transformer 16, a blocking diode assembly 18 and a selector switch 20 connected as shown. When it is desired to charge two groups of 12-volt batteries, switch 20 is closed and two groups 22 and 24 containing an equal number of batteries are connected in series to leads 26, 26 and 28, 28, respectively. While in actual practice each group includes from fifteen to seventeen 12-volt batteries, only three are shown for purposes of simplicity.

When on-off switch 30 is closed, the alternating current from source 10 is fed to rectifier bridge 12 by leads 32, 34 for full-wave rectification in a conventional manner. The pulsating D.C. from bridge 12 is fed to balancing transformer 16 by a conductor 36 where it is divided at a point 37 between the transformer coils 38 and 40 wound on a common core 42. The winding ratio of coils 38 and 40 is 1:1 with the current in one coil flowing in the opposite direction from that in the other as shown by the arrows in FIG. 1 so that the currents in the coils produce opposing magnetic flux in core 42.

From transformer 16 the divided current is fed to the two groups of 12-volt batteries 22 and 24 through selector switch 20 by means of leads 26, 26 and 28, 28, respectively.

The dividing or balancing function of transformer 16 can be illustrated by the following example. Assume that one of the two parallel connected loads 22 or 24 was greater or less than the other due to the particular characteristics of the batteries in a group. This could occur, for example, if the batteries in group 22 had a greater total internal resistance than those of group 24. If this occurred, group 24 would tend to draw a higher current through its corresponding transformer winding 40. When the current in windings 40 and 38 are balanced there is no self-inductance in transformer 16 but when current in winding 40 is greater than that in winding 38 a net magnetic effect results causing a net self-inductance in the transformer. This net self-inductance will generate a voltage which will (1) tend to impede the larger current in winding 40 and (2) tend to increase the lower current in winding 38. The net result is that the unequal currents in the two windings will react on each other in such a way as to cause them to be adjusted towards a balanced condition.

The blocking diode assembly 18 consists of a pair of diode elements 44, 46 each of which is connected in a leg of the divider circuit and in a back-to-back arrangement with respect to each other as shown. The diodes when so connected block any circulating current which might occur between battery groups 22 and 24. Such circulating current is detrimental in that it tends to saturate the balancing transformer 16 which reduces its effectiveness.

When it is desired to charge 6-volt batteries, switch 20 is opened and the batteries to be charged are connected together in series between leads 26, 26. The number of 6-volt batteries which can be charged is twice that of a single group of 12-volt batteries.

The circuitry described above is effective to correct relatively small variations in load. A substantial unbalance, however, cannot be corrected by the balancing transformer. A further means is therefore provided to protect the charging equipment and batteries in the event of a large variation in load which could result, for example, from improper connection of the battery groups. Such means (FIG. 1) can take different forms but in the preferred embodiment it includes a relay coil 48 connected across one of the windings of balancing transformer 16 and having a set of normally open switch contacts 50. As explained previously, variations in current in the transformer windings will generate a voltage across the coils which if great enough will energize relay coil 48 which, in turn, will close switch 50 and thereby energize a second relay coil 52 and light a lamp 54 through a switch 56. Energization of relay 52 will open normally closed contacts 55 to shut down the battery charging equipment. Lamp 54 serves to alert the operator that a fault has developed so that it can be corrected and charging resumed before the partly formed batteries are damaged. Switch 57 is provided in a holding circuit for relay 52 and keeps the equipment shut off until reset by the operator actuating switch 30.

A second embodiment of the invention is shown in FIG. 2. All elements common to both embodiments have been identified with the same reference numerals. The difference between this arrangement and the circuit shown in FIG. 1 is that the rectifying bridge and blocking diode assembly have been combined in such a way so that four of the six diodes have a dual function of both rectifying the charging current and blocking the circulating current. In the FIG. 2 embodiment both sides of the A.C. line are connected to the input sides of coils 38 and 40 of the balancing transformer by branch conductors 56, 58 and 60, 62 which are connected to the line at points 64 and 66, respectively. Branches 56, 58 are provided with diodes 68, 70 and branches 60, 62 are provided with diodes 72, 74 respectively. The return conductor 76 from the batteries is connected to opposite sides of the line by branches 78, 80 provided with diodes 82, 84 respectively. It should be noted that the current to balancing transformer 16 is split at points 64 and 66 so that diodes 68, 70 and 72, 74 carry only half the total current and serve to both rectify and block. These diodes have a higher peak inverse rating for blocking and therefore result in greater circuit protection. The combined bridge also has the advantage of being more compact and reduces assembly time. Diodes 82 and 84 must carry full load current in just the same manner as all four diodes 14 of bridge 12 in the FIG. 1 embodiment.

While no means for detecting substantial unbalance between loads is shown in the FIG. 2 embodiment, it should be understood that an arrangement such as that shown in FIG. 1 could be incorporated therein if desired.

Although but two embodiments of the present invention have been illustrated and described, it will be apparent to those skilled in the art that various changes and modifications may be made therein without departing from the spirit of the invention or from the scope of the appended claims.

We claim:
1. A battery charging circuit for charging two groups of batteries in a parallel arrangement from a common source of alternating current comprising, a rectifier means for converting alternating current to direct current, a balancing transformer connected to the output of said rectifier means, said balancing transformer having two coils wound on a common core with said coils connected so that the charging current in the coils will produce opposing flux in said core, the current from each coil being fed to a group of batteries, and a pair of blocking diodes, said diodes being connected in a back-to-back arrangement across the input ends of said balancing transformer.

2. A battery charging circuit according to claim 1 in which the winding ratio of said transformer coils is 1:1.

3. A battery charging circuit according to claim 1 in which there is a switch means connected to the output side of said balancing transformer adapted when opened to cut off the flow of current to one of the two groups of batteries.

4. A battery charging circuit for charging two groups of batteries in a parallel arrangement from a common source of alternating current comprising, a rectifier means for converting alternating current to direct current, a balancing transformer connected to the output of said rectifier means, said balancing transformer having two coils wound on a common core with said coils connected so that the charging current in the coils will produce opposing flux in said core, the current from each coil being fed to a group of batteries, a pair of blocking diodes, said diodes being connected in a back-to-back blocking arrangement across the input ends of said balancing transformer, and means for detecting a substantial unbalance between the two parallel connected loads, said means including a relay coil connected across one of said transformer coils.

5. A battery charging circuit according to claim 4 in which said detecting means further includes a second relay coil and an indicator lamp connected across the line, said second relay coil and lamp adapted for energization by said first relay, said second relay adapted to open a switch and cut off current to said rectifier means.

6. A battery charging circuit for charging two groups of batteries in a parallel arrangement from a common source of alternating current comprising, a balancing transformer having a pair of coils wound on a common core with said coils connected so that the charging current in said coils will produce opposing flux in said common core, both sides of the A.C. line being connected to the input side of said coils by pairs of branch conductors, a diode provided at each of said branch conductors, said diodes adapted to both rectify the A.C. current and to block any circulating current in said coils, a return line from said batteries connected to opposite sides of the line by a pair of branch conductors, a diode mounted in each of said branch conductors adapted for cooperation with said first mentioned diodes to provide full-wave rectification of the A.C. current.

7. A battery charging circuit according to claim 6 in which the winding ratio of said transformer coils is 1:1.

8. A battery charging circuit according to claim 6 in which there is a switch means connected to the output side of said balancing transformer adapted when opened to cut off flow of current to one of the two groups of batteries.

References Cited in the file of this patent
UNITED STATES PATENTS
2,696,586    Lockyer _____ Dec. 7, 1954

UNITED STATES PATENT OFFICE
CERTIFICATE OF CORRECTION

Patent No. 3,021,469             February 13, 1962

Herbert C. Ganiere et al.

It is hereby certified that error appears in the above numbered patent requiring correction and that the said Letters Patent should read as corrected below.

Column 4, line 10, after "back-to-back" insert -- blocking --.

Signed and sealed this 19th day of June 1962.

(SEAL)
Attest:

ERNEST W. SWIDER
Attesting Officer

DAVID L. LADD
Commissioner of Patents